United States Patent
Jackson et al.

(10) Patent No.: US 7,387,665 B2
(45) Date of Patent: Jun. 17, 2008

(54) INKJET INK AND INK SET

(75) Inventors: Christian Jackson, Wilmington, DE (US); Kuo Hsiung Kung, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 11/715,620

(22) Filed: Mar. 8, 2007

(65) Prior Publication Data

US 2007/0242091 A1    Oct. 18, 2007

Related U.S. Application Data

(60) Provisional application No. 60/791,527, filed on Apr. 12, 2006.

(51) Int. Cl.
*C09D 11/02* (2006.01)
*B41J 2/01* (2006.01)

(52) U.S. Cl. .................... 106/31.27; 347/100

(58) Field of Classification Search ........... 106/31.27; 347/100
See application file for complete search history.

(56) References Cited

U.S. PATENT DOCUMENTS

| 5,143,547 | A | | 9/1992 | Kappele | |
|---|---|---|---|---|---|
| 5,560,771 | A | * | 10/1996 | Takemoto et al. | 106/31.49 |
| 5,772,742 | A | * | 6/1998 | Wang | 106/31.27 |
| 6,458,195 | B1 | | 10/2002 | Stoffel et al. | |
| 6,641,257 | B1 | * | 11/2003 | Shi et al. | 347/100 |
| 6,669,766 | B2 | * | 12/2003 | Leu et al. | 106/31.27 |
| 6,706,102 | B2 | | 3/2004 | Blease et al. | |
| 6,793,722 | B2 | * | 9/2004 | Chien et al. | 106/31.27 |
| 2004/0074018 | A1 | * | 4/2004 | Wuzik et al. | 8/543 |
| 2004/0100643 | A1 | | 5/2004 | Jones et al. | |
| 2005/0172856 | A1 | * | 8/2005 | Hasemann | 106/31.43 |
| 2005/0211133 | A1 | * | 9/2005 | Chou et al. | 106/31.48 |
| 2006/0139428 | A1 | * | 6/2006 | Osumi et al. | 347/100 |
| 2007/0091156 | A1 | | 4/2007 | Jackson | |

* cited by examiner

*Primary Examiner*—Helene Klemanski

(57) ABSTRACT

This invention pertains to an aqueous based magenta inkjet ink with good hue, chroma, optical density, fade resistance, and long latency, comprising a certain specified combination of soluble magenta colorants.

8 Claims, No Drawings

INKJET INK AND INK SET

CROSS-REFERENCE TO RELATED APPLICATION

This application claims priority under 35 U.S.C. §119 from U.S. Provisional Application Ser. No. 60/791,527, filed Apr. 12, 2006 which is hereby incorporated by reference in its entirety.

BACKGROUND OF THE INVENTION

The present invention pertains to a magenta inkjet ink and in particular to an aqueous based magenta inkjet ink comprising a mixture of certain soluble magenta colorants. The invention also pertains to an ink set comprising this magenta ink.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

Inkjet printers are equipped with an ink set which, for full color printing, typically comprises a cyan, magenta and yellow ink (CMY). An ink set will also commonly comprise a black ink (CMYK). Colorants for the inks can be soluble in the ink vehicle (dyes) or insoluble (pigments).

The ink set should provide printed images having good color characteristics, such as correct hue and high chroma. Preferably, the ink set will achieve these favorable characteristics on a range of media including plain paper as well as specialty media such as transparency film and coated paper. Also, preferably, the hard copy output is reasonably lightfast.

Individual inks should generally exhibit good crusting resistance, good stability, proper viscosity, proper surface tension, good color-to-color bleed alleviation, rapid dry time, consumer-safety, and low strike-through.

Various magenta, yellow and cyan dyes, and CYM dye sets, have been disclosed for plain paper and photo paper printing. Most of the attention though is directed to selection of the magenta colorant.

Probably the most commonly mentioned magenta dye is Reactive Red 180 which can be used alone or in combination with Acid Red 52 to achieve a more violet shade. The combination of dyes is adjusted to give the desired balance of hue, chroma and lightfastness. Reactive dyes such as RR180 are known to hydrolyze in the aqueous ink vehicle causing the pH to drift and producing sulfate ions which cause problems with ink reliability. The reactive dyes can be hydrolyzed and purified before use but this adds an additional expensive processing step to the ink production.

As noted in U.S. Pat. No. 6,641,257, magenta is typically the colorant most vulnerable to light. It is desirable for a dye to have the best possible fade resistance. The '257 reference provides lightfastness evaluation of a number of magenta dyes of which Acid Red 37, Acid Red 289, Direct Red 75, Direct Red 212, Reactive Red 141, Reactive Red 23, Reactive Red 195 are rated highest, and more lightfast than Reactive Red 180.

A magenta ink with excellent lighffastness comprising a mixture of Magenta 377 and Acid 52 is disclosed in U.S. Pat. No. 5,772,742. Hydrolyzed Reactive Red 23 magenta colorant is disclosed in U.S. Pat. No. 6,458,195 and described as having high lightfastness.

Other known magenta colorants include Direct Red 227 as disclosed, for example, in U.S. Pat. No. 5,143,547 as part of a CYM ink set. A mixture of magenta anthrapyridone dye and Reactive Red 23, Reactive Red 24, Reactive Red 31, Reactive Red 120, Reactive Red 180, Reactive Red 241, Acid Red 35, Acid Red 52, Acid Red 249, Acid Red 289, Acid Red 388, Direct Red 227 or CAS No. 153204-88-7 is disclosed in U.S. Pat. No. 6,706,102. A mixture of Acid Red 92 and Reactive Red 180, Direct Red 75, or Reactive Red 159 is disclosed in U.S. Pat. No. 6,793,722.

As inkjet printheads deliver smaller and smaller drops for improved printing resolution, colorant loadings must increase to compensate for the lower amounts of ink applied. However, increasing dye concentration in an ink can cause problems with reliability. For example, oftentimes "latency" or "decap", one aspect of reliability, is negatively impacted (reduced) by increased dye concentrations. The decap (latency) time refers to the amount of time inkjet nozzles can remain uncapped and idle, and still fire without missing or misdirected drops. Preferably, to avoid printing defects, an ink will preferably exhibit favorable (long) decap times even at high dye loadings.

There is still a need for improved colorants and/or colorant selection for magenta dye-based inks and in particular for dyes that can be used reliability at high loadings and provide good hue, chroma, optical density and fade resistance.

SUMMARY OF THE INVENTION

In one aspect, this invention pertains to magenta inkjet ink comprising an aqueous vehicle and a magenta dye colorant soluble in the aqueous vehicle, wherein the magenta dye colorant comprises Direct Red 75 and a second dye selected from the group consisting of Acid Red 52, Acid Red 289 and mixtures thereof.

In one embodiment, the weight ratio of Direct Red 75 to second dye is equal to or greater than 1:1 and less than 4:1.

In another aspect the present invention pertains to an inkjet ink set comprising a magenta ink as set forth above and further comprising a yellow and cyan ink; wherein the yellow ink comprises an aqueous vehicle and a yellow dye colorant soluble in the aqueous vehicle (preferably Direct Yellow 132, Acid Yellow 23 and mixtures thereof and wherein the cyan ink comprises an aqueous vehicle and a cyan colorant soluble in the aqueous vehicle (preferably Direct Blue 199, Acid Blue 9 and mixtures thereof).

In yet another aspect the present invention pertains a method for ink jet printing onto a substrate, comprising the steps of, in any workable order:

(a) providing an ink jet printer that is responsive to digital data signals;

(b) loading the printer with a substrate to be printed;

(c) loading the printer with an inkjet ink or inkjet ink set as set forth; and (d) printing onto the substrate using the inkjet ink inkjet ink set in response to the digital data signals.

Unless otherwise indicated, dyes are referred to by their "C.I." designation established by Society Dyers and Colourists, Bradford, Yorkshire, UK and published in The Color Index, Third Edition, 1971. The dye content in a given ink refers the total dye present in that ink, whether a single dye species or a combination of two or more dye species. Further, it is to be appreciated that all reference herein to numerical values stated in ranges include each and every value within that range.

DETAILED DESCRIPTION OF THE PREFERRED EMBODIMENTS

Colorant

The magenta dye colorant prescribed herein comprises Direct Red 75 and a second dye selected from Acid Red 52 and/or Acid Red 289. Commercial sources of these dyes are generally well known.

The dye content in a full strength ink is typically between about 1% and 10% by weight of the total weight of ink. More typically the dye content is between about 2% and 8% by weight of the total weight of ink. So-called "light" inks generally will contain somewhat less dye, generally in the range of about 0.1 to 2% by weight of the total weight of ink. The inks of this invention are particularly advantageous for dye loadings of greater than 3% by weight of the total weight of ink, and even greater than 4% by weight.

The weight ratio of DR 75 to second dye is typically less than about 5:1 and greater than about 2:3. At ratios greater than about 5:1 the hue tends to be unfavorable (too red). More preferable, from the standpoint of hue, is a ratio of 4:1 or less. Somewhat lower ratios, less than 3:1 and even less than 2:1, are advantageous not only for hue but also for beneficial jetting performance (long decap). At ratios less than about 2:3, the hue tends to be unfavorable on the violet side. In one embodiment, the weight ratio of DR 75 to second dye is 1:1 or greater and in another embodiment, the ratio is between about 2:1 and 1:1.

Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Particularly advantageous vehicle formulations for long decap are provided in commonly-owned U.S. Provisional Application Ser. No. 60/728,543 (filed Oct. 20, 2005), the disclosure of which is incorporated by reference for all purposes as if fully set forth.

Additives

Other ingredients, additives, may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or non-ionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink, is typically in the range of about 70% to about 99.8%, and more typically about 80% to about 99%. Colorant is generally present in amounts up to about 10%. Percentages are weight percent of the total weight of ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Sets

The term "ink set" refers to all the individual inks or other fluids an inkjet printer is equipped to jet. Ink sets typically comprise at three differently colored inks (such as CMY), and still more typically at least four differently colored inks (such as CMYK), wherein at least one of the inks is an aqueous inkjet ink as described above.

The other inks of the ink set may contain dyes, pigments or combinations thereof as the colorant. Useful cyan dyes for a cyan ink include Acid Blue 9 and Direct Blue 199; and useful yellow dyes for a yellow ink include Direct Yellow 86, Direct Yellow 132 and Acid Yellow 23; useful black dyes for a black ink include DB 168, Food Black 2, DK 31, DK 195, AK 194 and AK 172. Black ink can advantageously comprises pigment such as carbon black pigment and especially a self-dispersing carbon black pigment.

In addition to the typical CMYK inks, the ink sets in accordance with the present invention may further comprise one or more "gamut-expanding" inks, including different colored inks such as an orange ink, a green ink, a red ink and/or a blue ink, and combinations of full strength and light strengths inks such as light cyan and light magenta. Such other inks are, in a general sense, known to those of ordinary skill in the art.

Method of Printing

The inks and ink sets of the present invention can be printed with any suitable inkjet printer including printer equipped with "piezo" and "thermal" printheads. The substrate can be any suitable substrate including paper such as "plain" paper, and inkjet specialty and glossy paper.

EXAMPLES

Ink Preparation

Inks were prepared according to Ink Formulation 1, with the particular dye, and amounts, specified in each example. Ingredients, given as weight percent of the total weight of ink, were mixed together and filtered. Water was deionized. Surfynol® 465 is a surfactant from Air Products Corp (Allentown, Pa., USA).

| Ink Formulation 1 | |
|---|---|
| Dye | As specified in examples |
| Diethylene glycol | 5.0% |
| 2-pyrrolidone | 3.0% |
| Urea | 7.0% |
| 1,2-hexanediol | 3.0% |
| 1,6-hexanediol | 3.0% |
| Surfynol 465 | 0.5% |
| Water | Balance to 100% |

Hue, Chroma and Optical Density Measurements

Inks were printed on Epson Premium Glossy Photo Paper and (plain paper) HP Office, Xerox 4024 and Hammermill Copy Plus using a Canon i960 printer in "High Quality" print mode. Optical Density (OD), chroma and hue were measured using a Greytag-Macbeth Spectrolino spectrometer. Plain paper results are an average of the three papers.

Latency Test

Latency (Decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted.

During each scan across the page, the pen prints a pattern of 149 vertical lines spaced about $\frac{1}{16}$ inch apart. Each vertical line was formed by all nozzles firing one drop, therefore the line is one drop wide an about ½ inch high corresponding to the length of the nozzle array on the printhead. The first vertical line in each scan is the first drop fired from each nozzle after the prescribed latency period, the fifth line was the fifth drop from each nozzle on that scan, and so forth for all 149 lines.

The pattern was repeated at increasingly longer time intervals (decap times) between scans. The standard time intervals between scans was 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Nothing beyond 1000 seconds was attempted.

Upon completion of the test, the $1^{st}$, $5^{th}$, and $32^{nd}$ vertical lines in each scan were examined for consistency, misdirected drop deposits, and clarity of the print. These lines correspond to the $1^{st}$, $5^{th}$ and $32^{nd}$ drops of ink droplets ejected from the nozzle after a prescribed latency period. The decap time for each drop was the longest time interval where the particular vertical line can be printed without significant defects.

Preferably, the pen will fire properly on the first drop. However, when the first drop fails to eject properly, the decap time for the fifth and thirty-second drops can provide some information as to the severity of the pluggage and how easily the nozzles can be recovered.

The results tables hereinafter report only the first drop decap time and refer to the value simply as the "Decap" in units of seconds.

Example 1

Comparative

For comparison, Inks with Reactive Red 180 alone and DR75 alone were prepared and printed as shown the following table.

| | Ink Formula 1 with the following dyes and amounts | | |
|---|---|---|---|
| | Ink 1a (Comp.) | Ink 1b (Comp.) | Ink 1c (Comp.) |
| Direct Red 75 | | 4.0 | 5.0 |
| Reactive Red 180 | 5.0 | | |
| Print Properties | | | |
| OD, Glossy Paper | 1.84 | 1.96 | 1.97 |
| OD, Plain Paper | 1.14 | 1.10 | 1.15 |
| Chroma, Glossy Paper | 86 | 83 | 78 |
| Chroma, Plain Paper | 70 | 57 | 56 |
| Hue, Glossy Paper | 9 | 22 | 21 |
| Hue, Plain Paper | 4 | 8 | 11 |
| Decap Time (sec.) | 700 | 20 | 30 |

Ink 1a with RR 180 provides a kind of magenta color standard for the inventive inks. Also, the Ink 1a formulation has good, but not outstanding decap. Inks 1b and 1c show that DR 75 has good chroma, but that it is "red" in comparison to RR 180. As noted previously, DR 75 is reported (U.S. Pat. No. 6,641,257) to have better lighffastness than RR 180. Also, inks with DR 75 alone have poor decap. The formulation used here (Ink Formulation 1) was chosen because it has been shown, in general, to be advantageous in providing long decap with a number of different dyes (as demonstrated, for example, in commonly owned U.S. Provisional Application Ser. No. 60/728,543 (filed Oct. 20, 2005)).

Example 2

Magenta ink inks with DR 75 in admixture with AR 52 and/or AR 289 are summarized in the following tables. As shown, small amounts of AR 52 and/or AR 289 are able to shade the ink to a hue comparable to the RR 180 in Comparative Example 1a. Also, the inventive inks have favorable chroma and optical density.

Surprisingly and unexpectedly, the same levels of AR 52 and/or AR 289 also cause a very favorable increase in decap. As supported by the Comparative Examples herein after, the increase in decap is not simply a dilution of the DR 75 content, but rather some sort of favorable interaction with the AR 52 and/or AR 289.

| | Ink Formula 1 with the following dyes | | | | |
|---|---|---|---|---|---|
| | Ink 2a | Ink 2b | Ink 2c | Ink 2d | Ink 2e |
| Direct Red 75 | 4.0 | 3.0 | 2.5 | 2.0 | 1.0 |
| Acid Red 289 | 1.0 | 2.0 | 2.5 | 3.0 | 4.0 |
| Print Properties | | | | | |
| OD, Glossy Paper | 2.04 | 2.06 | 2.11 | 1.99 | 2.05 |
| OD, Plain Paper | 1.23 | 1.29 | 1.30 | 1.27 | 1.28 |
| Chroma, Glossy Paper | 81 | 81 | 83 | 82 | 84 |
| Chroma, Plain Paper | 59 | 63 | 64 | 65 | 69 |
| Hue, Glossy Paper | 21 | 18 | 17 | 11 | 4 |
| Hue, Plain Paper | 6 | 4 | 2 | 0 | 354 |
| Decap Time (sec.) | 60 | 100 | >1,000 | >1,000 | >1,000 |

| | Ink Formula 1 with the following dyes and amounts | | | |
|---|---|---|---|---|
| | Ink 2f | Ink 2g | Ink 2h | Ink 2i |
| Direct Red 75 | 4.0 | 3.0 | 2.5 | 3.0 |
| Acid Red 52 | 1.0 | 2.0 | 2.5 | 1.0 |
| Acid Red 289 | | | | 1.0 |
| Print Properties | | | | |
| OD, Glossy Paper | 2.04 | 2.19 | 2.20 | 2.08 |
| OD, Plain Paper | 1.23 | 1.29 | 1.25 | 1.27 |
| Chroma, Glossy Paper | 79 | 79 | 76 | 78 |
| Chroma, Plain Paper | 56 | 57 | 57 | 59 |
| Hue, Glossy Paper | 16 | 4 | 2 | 12 |
| Hue, Plain Paper | 358 | 349 | 344 | 356 |
| Decap Time (sec.) | 200 | >1,000 | >1,000 | >1,000 |

Example 3

Comparative

Magenta ink inks with DR 75 in admixture with AR 249 are summarized in the following table. As shown, this colorant combination does not yield favorable decap times. In a similar formulation, 5% of AR249 alone gives >1000 second decap.

In addition to unfavorable decap, this dye mixtures shown gives an unfavorable hue which is more red than RR180.

| | Ink Formula 1 with the following dyes | | |
|---|---|---|---|
| | Ink 3a (Comp.) | Ink 3b (Comp.) | Ink 3c (Comp.) |
| Direct Red 75 | 4.0 | 3.0 | 2.0 |
| Acid Red 249 | 1.0 | 2.0 | 3.0 |
| Print Properties | | | |
| OD, Glossy Paper | 1.97 | 2.03 | 1.97 |
| OD, Plain Paper | 1.12 | 1.19 | 1.17 |
| Chroma, Glossy Paper | 84 | 84 | 85 |
| Chroma, Plain Paper | 59 | 62 | 65 |
| Hue, Glossy Paper | 22 | 21 | 17 |
| Hue, Plain Paper | 9 | 8 | 6 |
| Decap Time (sec.) | 30 | 60 | 50 |

Example 4

Comparative

Magenta ink inks with DR 75 in admixture with AR37 or AR92 are summarized in the following table. As with Comparative Example 4, these colorant combinations do not yield favorable decap times. Also, in the case of Ink 4a, there is unfavorable hue.

| | Ink Formula 1 with the following dyes and amounts | |
|---|---|---|
| | Ink 4a (Comp.) | Ink 4b (Comp.) |
| Direct Red 75 | 2.5 | 2.5 |
| Acid Red 37 | 2.5 | — |
| Acid Red 92 | — | 2.5 |
| Print Properties | | |
| OD, Glossy Paper | 2.03 | 2.12 |
| OD, Plain Paper | 1.13 | 1.21 |
| Chroma, Glossy Paper | 87 | 85 |
| Chroma, Plain Paper | 62 | 66 |
| Hue, Glossy Paper | 22 | 15 |
| Hue, Plain Paper | 8 | 2 |
| Decap Time (sec.) | 60 | 20 |

Example 5

The inventive inks, as part of an ink set, provide good color gamut. The following cyan and yellow inks were prepared and combined into ink sets with various magenta inks of the previous examples. The color gamut of each set was measured from printed primary, secondary and ternary mixtures printed on Epson Premium photo glossy paper and Xerox 4024 plain paper. The gamut volume was calculated according to methods described in US20040100643.

As shown, ink sets with the inventive magenta inks comprising DR 75 and AR 52 or AR 289 have better (larger) gamut than Comparative Ink 1c with DR 75 alone. Also, ink sets with magenta inks having at least 2% AR52 or AR 289

(sets C, D, E, F, H) tend to have larger gamuts than ink sets with magenta inks having only 1% AR52 or AR 289 (sets B and G).

| | Cyan Ink Formulations | | |
|---|---|---|---|
| | Cyan Ink 5A | Cyan Ink 5B | Cyan Ink 5C |
| Direct Blue 199 | 5.0% | 3.0% | — |
| Acid Blue 9 | — | 2.0% | 5.0% |
| Glycerol | 5.0% | 5.0% | 5.0% |
| Diethylene glycol | 5.0% | 5.0% | 5.0% |
| Urea | 7.0% | 7.0% | 7.0% |
| 1,2-hexanediol | 3.0% | 3.0% | 3.0% |
| 1,5-pentanediol | 4.0% | 4.0% | 4.0% |
| Surfynol 465 | 0.5% | 0.5% | 0.5% |
| Water, balance to 100% | Bal. | Bal. | Bal. |

| | Yellow Ink Formulations | | |
|---|---|---|---|
| | Yellow Ink 5D | Yellow Ink 5E | Yellow Ink 5F |
| Direct Yellow 132 | 5.0% | 3.0% | — |
| Acid Yellow 23 | — | 2.0% | 5.0% |
| Glycerol | 5.0% | 5.0% | 5.0% |
| Diethylene glycol | 5.0% | 5.0% | 5.0% |
| Urea | 7.0% | 7.0% | 7.0% |
| 1,2-hexanediol | 3.0% | 3.0% | 3.0% |
| 1,5-pentanediol | 4.0% | 4.0% | 4.0% |
| Surfynol 465 | 0.5% | 0.5% | 0.5% |
| Water, balance to 100% | Bal. | Bal. | Bal. |

| Ink Sets | Magenta Ink | Cyan Ink | Yellow Ink | Gamut Volume Epson Glossy (L*a*b* units) | Gamut Volume Xerox 4024 (L*a*b* units) |
|---|---|---|---|---|---|
| Set A (Comp.) | Ink 1c | Ink 5A | Ink 5F | 537,000 | 214,000 |
| Set B | Ink 2a | Ink 5C | Ink 5D | 648,000 | 245,000 |
| Set C | Ink 2c | Ink 5C | Ink 5F | 686,000 | 279,000 |
| Set D | Ink 2c | Ink 5C | Ink 5D | 714,000 | 279,000 |
| Set E | Ink 2c | Ink 5C | Ink 5E | 721,000 | 280,000 |
| Set F | Ink 2c | Ink 5A | Ink 5D | 706,000 | 257,000 |
| Set G | Ink 2f | Ink 5B | Ink 5F | 594,000 | 230,000 |
| Set H | Ink 2g | Ink 5C | Ink 5E | 668,000 | 254,000 |

Various other modifications, alterations, additions or substitutions of the compositions and methods of this invention will be apparent to those skilled in the art without departing from the spirit and scope of this invention. This invention is not limited by the illustrative embodiments set forth herein, but rather is defined by the following claims.

The invention claimed is:

1. A magenta inkjet ink comprising an aqueous vehicle and a magenta dye colorant soluble in the aqueous vehicle, wherein the magenta dye colorant comprises Direct Red 75 and a second dye selected from the group consisting of Acid Red 289 and mixtures of Acid Red 289 and Acid Red 52, and wherein the weight ratio of Direct Red 75 to second dye is less than 4:1 and equal to or greater than 1:1.

2. A magenta inkjet ink comprising an aqueous vehicle and a magenta dye colorant soluble in the aqueous vehicle, wherein:
   the magenta dye colorant consists of Direct Red 75 and a second dye; the second dye consists of Acid Red 52; and, the weight ratio of Direct Red 75 to second dye is less than 4:1 and equal to or greater than 1:1.

3. The ink of claim 1 having a surface tension in the range of about 20 dyne/cm to about 70 dyne/cm at 25° C., and a viscosity of lower than about 30 cP at 25° C.

4. The ink of any of claim 1, 2, or 3 wherein the total dye concentration is greater than 3% by weight of the total ink.

5. The ink of claim 4 wherein the total dye concentration is greater than 4% by weight of the total ink.

6. An inkjet ink set comprising a magenta, yellow, and cyan ink wherein:
   a) the magenta ink is an ink as set forth in claim 1 or 2,
   b) the yellow ink comprises an aqueous vehicle and a yellow colorant soluble in the aqueous vehicle, wherein the yellow dye colorant comprises Direct Yellow 132, Acid Yellow 23 and mixtures thereof;
   c) the cyan ink comprises an aqueous vehicle and a cyan colorant soluble in the aqueous vehicle, wherein the cyan dye colorant comprises Direct Blue 199, Acid Blue 9 and mixtures thereof.

7. A method for ink jet printing onto a substrate, comprising the steps of:
   (a) providing an ink jet printer that is responsive to digital data signals;
   (b) loading the printer with a substrate to be printed;
   (c) loading the printer with an inkjet ink as set forth in claim 1; and
   (d) printing onto the substrate using the inkjet ink in response to the digital data signals.

8. A method for ink jet printing onto a substrate, comprising the steps of:
   (a) providing an ink jet printer that is responsive to digital data signals;
   (b) loading the printer with a substrate to be printed;
   (c) loading the printer with an inkjet ink set as set forth in claim 6; and
   (d) printing onto the substrate using the inkjet ink set in response to the digital data signals.

* * * * *